INVENTOR.
FRANKLIN C. DYER
FLETCHER J. MACLARY
BY
Marvin Moody
ATTORNEY

INVENTOR.
FRANKLIN C. DYER
FLETCHER J. MACLARY
BY
Marvin Moody
ATTORNEY

United States Patent Office 2,835,889

Patented May 20, 1958

2,835,889

SINGLE SIDE BAND COMMUNICATION SYSTEM USING MECHANICAL FILTERS

Franklin C. Dyer and Fletcher J. Maclary, Dallas, Tex., assignors to Collins Radio Company, Cedar Rapids, Iowa, a corporation of Iowa Application March 4, 1953, Serial No. 340,250

2 Claims. (Cl. 343—200)

This invention relates in general to a communication scheme and in particular to a single side band communication system using highly selective filters.

As the communication spectrum becomes more and more crowded, it is desirable to make a maximum utilization of band width so as to allow more and more stations to operate simultaneously.

It is an object of the present invention to use a single carrier that may be modulated by two signals in a manner such that they may be separated at a receiving site.

Another object of the present invention is to provide a scheme wherein two channels of intelligence may be simultaneously transmitted on a single carrier.

Yet another object of this invention is to separate a pair of side bands derived from the same carrier and which carry different intelligence.

A feature of this invention is found in the provision for a pair of single side band producing means which utilize the same carrier with one side band being the carrier plus the modulation frequency and the other side band being the carrier minus a second modulation frequency.

Further objects, features and advantages of this invention will become apparent from the following description and claims when read in view of the drawings, in which:

Figure 2:
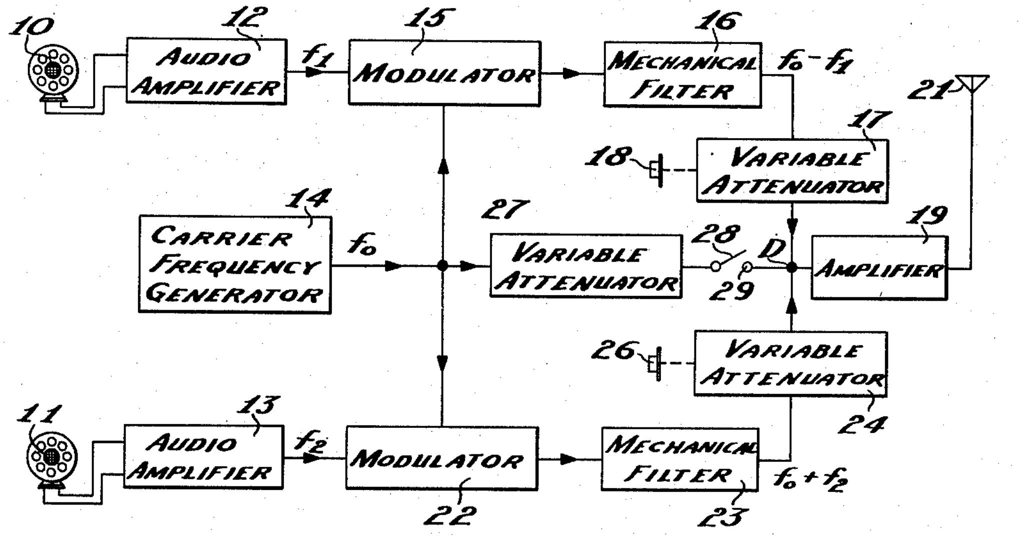
Figure 2 is a schematic view of a transmitter according to the principles of this invention; and, Figure 3 illustrates a receiving system according to the principles of this invention.

Figure 2 illustrates a pair of microphones 10 and 11 which are connected respectively to audio amplifiers 12 and 13. The output of audio amplifier 12 is supplied to a modulator 15 which also receives an input from a carrier frequency generator 14. The output of the modulator 15 is passed to an electromechanical filter 16 which may be constructed according to the principles disclosed in patent application Serial Number 248,011 filed September 24, 1951, now Patent No. 2,717,361, and entitled "Mechanical Filters."

The output of the mechanical filter is supplied to a variable attenuator 17 which has a control knob 18 that adjusts the output amplitude. The output of the variable attenuator 17 is supplied to an amplifier 19 which is connected to a transmitting antenna 21.

A second modulator 22 receives the output of the audio amplifier 13 and an input from the carrier frequency generator 14. A second mechanical filter 23 receives the output of the modulator 22 and a second variable attenuator 24 receives the output of the mechanical filter. A control knob 26 is connected to the variable attenuator 24 and adjusts the impedance. A third variable attenuator 27 is also connected to the carrier frequency generator 14 and its output is connected to a switch 28 that is engageable with a terminal 29 which is connected to the amplifier 19.

In operation, the circuit of Figure 2 with the switch 28 open is capable of supplying a pair of single side band signals to the antenna 21 with each side band containing a different modulation obtained, respectively, from the microphones 10 and 11.

Figure 1:
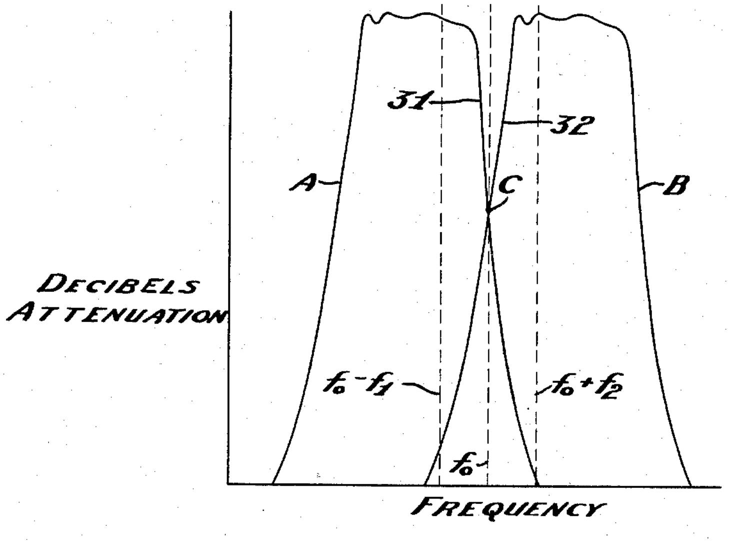
Figure 1 illustrates the response curves of a pair of electromechanical filters.

This may be explained by considering Figure 1 which illustrates the response characteristics of a pair of mechanical filters that might be the filters 16 and 23, for example. The electromechanical filters described in the co-pending applications Ser. Nos. 248,011 and 283,340, now Patent No. 2,693,579, filed September 24, 1951, and April 21, 1952, respectively, have response characteristics as shown by curves A and B in Figure 1 and have much steeper edges than equivalent electrical circuits. The mechanical filters 16 and 23 are constructed so as to have a center frequency which is different but such that the high frequency edge 31 of the curve A overlaps the low frequency edge 32 of the curve B at a point below the crest of the curves and which might be, for example, thirty decibels below the peaks of the curves.

It is well known that the modulation process produces the sum and difference side bands of the input signals. If the mechanical filter 16 has a frequency response such that the difference frequency $f_0-f_1$ falls in its maximum response portion, then the sum side band of $f_0+f_1$ will not pass the filter 16 due to the substantial attenuation that would occur on the sloping portion 31 of the filter. Stated differently, the filter 16 is capable of separating the difference or low side band from the other outputs of the modulator 13.

If, on the other hand, the mechanical filter 23 has a pass band such that it passes the high side band from the modulator 22, then the lower side band will be substantially rejected due to the sloping portion of the curve 32.

Thus, the outputs of the filters 16 and 23 will contain, respectively, the low and high side bands from a pair of modulating sources. The carrier $f_0$ will also be present in their outputs but at an attenuated level corresponding to the cross-over point C of the curves A and B. With the switch 28 open the carrier arriving at point D will be cancelled due to a phase difference which may be controlled by the variable attenuators 17 and 24. Thus, the amplifier 19 and antenna 21 will receive only the lower side band $f_0-f_1$ from the modulating source 10 and the upper side band $f_0+f_2$ from the modulating source 11.

Figure 3:
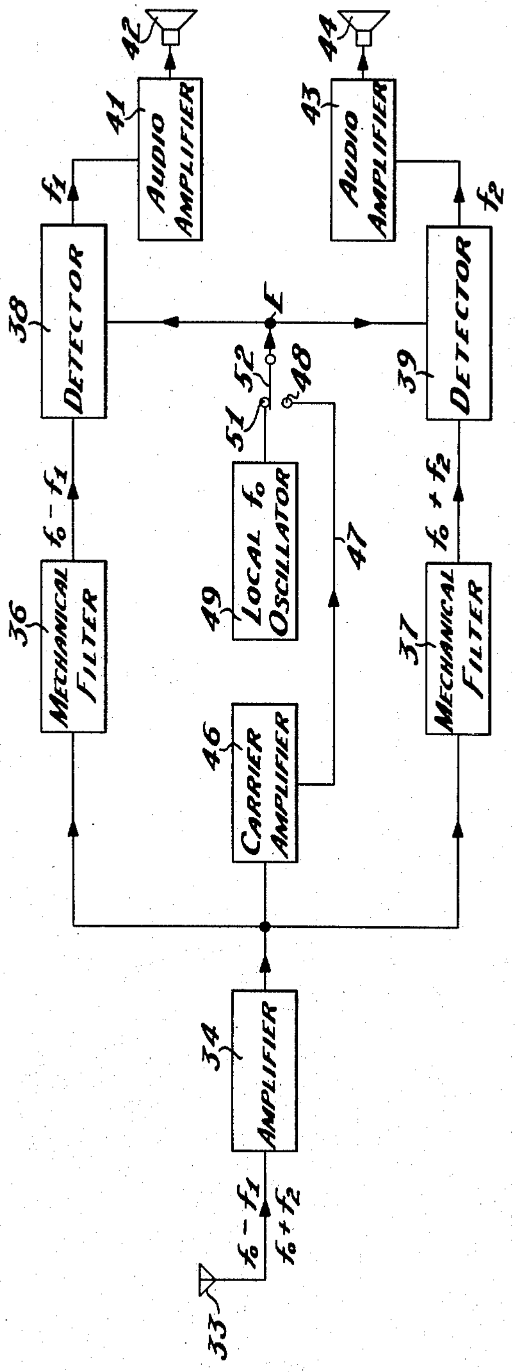

Figure 3 illustrates a detecting means for removing the intelligence from the two side bands transmitted. A receiving antenna 33 supplies an input to a radio frequency amplifier 34 which is connected to a pair of mechanical filters 36 and 37. The detector 38 receives the output of the mechanical filter 36 and a second detector 39 receives the output of the mechanical filter 37.

A first audio amplifier 41 receives the output of detector 38 and a loud speaker 42 is connected to the audio amplifier. A second audio amplifier 43 is connected to the detector 39 and a second loud speaker 44 is connected to amplifier 43.

A carrier amplifier 46 is connected to the amplifier 34 and has an output lead 47 that is connected to terminal 48. A local oscillator 49 is connected to a terminal 51. The detectors 38 and 39 are connected electrically to a point E which is attached to a movable switch 52 that is movable between the terminals 48 and 51.

In operation, if an incoming signal received by the antenna 33 contains the upper and lower side bands with the carrier suppressed, the switch 52 will be connected to terminal 51 to produce the carrier frequency $f_0$ so that it may be reinserted to allow detection in the detectors 38 and 39.

If the mechanical filter 36 is tuned to the low side band $f_0-f_1$, then it will reject the upper side band $f_0+f_2$ and pass only the lower side band. The detector 38 receives the lower side band and mixes it with the carrier signal from the local oscillator 49 and detects the intelligence $f_1$ which appears at the loud speaker 42.

The mechanical filter 37 is centered at the high side band $f_0+f_2$ and rejects the lower side band $f_0-f_1$. The detector 39 receives the high side band from the filter 37 and the carrier from the local oscillator 49 and removes the intelligence $f_2$. The loud speaker 44 reproduces the intelligence carried on the frequency $f_2$.

An alternative method of operation occurs when the transmitter shown in Figure 2 operates with the switch 28 closed so that a portion of the carrier $f_0$ is transmitted with the upper and lower side bands. When this occurs the receiver may be operated by moving the switch 52 to engage the contact 48 so that the incoming carrier component $f_0$ may be inserted in the detectors 38 and 39. This eliminates the need of a local oscillator 49 and the transmitting carrier is used in the detection process. Single side band detection is well known to those skilled in the art and will not be described in detail herein.

It is seen that the main feature of the present invention is that it allows a single carrier to be modulated by two different intelligences and by utilizing the highly selective characteristics of an electromechanical filter according to the principles of the co-pending applications Serial Numbers 248,011 and 283,340, and allows both the high and low side bands of the carrier to be transmitted but with each side band containing different intelligence.

This results in a saving in band width and an increased number of channels would be available.

Although the invention has been described with respect to a preferred embodiment thereof, it is not to be so limited as changes and modifications may be made therein which are within the ful intended scope of the invention, as defined by the appended claims.

We claim:

1. In a communication system a transmitter having a carrier frequency generator, a first modulator receiving an input from the carrier frequency generator, a first source of intelligence supplying an input to the first modulator, a second modulator receiving an input from the carrier frequency generator, a second source of intelligence supplying an input to the second modulator, a first mechanical filter receiving the output of the first modulator and with a response characteristic such that it passes the lower side band of the carrier which carries the first intelligence source, a second mechanical filter connected to the output of the second modulator and with a response characteristic such that it passes the upper side band of the carrier which carries the second intelligence, a variable attenuator connected to said carrier frequency generator, a switch connectible to said attenuator, and an antenna connected to said first and second mechanical filters and said switch.

2. In a communication system wherein a single carrier is modulated by a pair of intelligence sources, and the upper side band of the carrier and one of the intelligence sources and the lower side band of the carrier and the other intelligence sources are transmitted, a receiver having a receiving antenna, a pair of mechanical filters connected to said receiving antenna with the first mechanical filter tuned to the lower side band of the carrier and the first intelligence, and the second mechanical filter tuned to the upper side band of the carrier and the second intelligence, a pair of single side band detectors receiving the outputs of the first and second mechanical filters, a local oscillator, a carrier amplifier connected to the receiving antenna to pass the carrier frequency, a switch connected to the first and second single side band detectors and movable between the output of the local oscillator and the carrier amplifier, and first and second loud speakers connected, respectively, to the first and second single side band detectors to reproduce the intelligence transmitted.

References Cited in the file of this patent

UNITED STATES PATENTS

| | | |
|---|---|---|
| 1,461,064 | Martin | July 10, 1923 |
| 1,608,566 | Potter | Nov. 30, 1926 |
| 1,685,357 | Griggs | Sept. 25, 1928 |
| 1,717,064 | Rettenmeyer | June 11, 1929 |
| 1,773,116 | Potter | Aug. 19, 1930 |
| 1,797,284 | Coram | Mar. 24, 1931 |
| 1,854,247 | Brand | Apr. 19, 1032 |
| 2,261,628 | Lovell | Nov. 4, 1941 |
| 2,460,075 | Dickieson | Jan. 25, 1949 |
| 2,501,488 | Adler | Mar. 21, 1950 |
| 2,578,452 | Roberts | Dec. 11, 1951 |